United States Patent [19]

Stross

[11] Patent Number: 5,469,815
[45] Date of Patent: Nov. 28, 1995

[54] METHOD OF LOADING LIVE POULTRY

[76] Inventor: Lawrence L. Stross, P.O. Box 7578, Station M, Edmonton, Alberta, Canada, T5E 6K1

[21] Appl. No.: 373,989

[22] Filed: Jan. 18, 1995

[51] Int. Cl.⁶ .................................................. A01K 29/00
[52] U.S. Cl. ................................................................. 119/846
[58] Field of Search .............................. 119/21, 22, 843, 119/845, 846; 414/398, 393

[56] References Cited

U.S. PATENT DOCUMENTS

| | | | |
|---|---|---|---|
| 3,110,388 | 11/1963 | Elliott et al. | 119/845 |
| 3,942,476 | 3/1976 | Napier | 119/845 |
| 4,201,156 | 5/1980 | Kahler | 119/846 |
| 4,227,660 | 10/1980 | Denny et al. | 242/86.52 |
| 4,987,834 | 1/1991 | Peck, Jr. et al. | 104/300 |

FOREIGN PATENT DOCUMENTS

| | | | |
|---|---|---|---|
| 2330315 | 6/1977 | France | 119/846 |
| 2413390 | 9/1975 | Germany | 119/22 |

Primary Examiner—Todd E. Manahan
Attorney, Agent, or Firm—Anthony R. Lambert

[57] ABSTRACT

A method of loading live poultry is described. Firstly, provide a transport vehicle having a plurality of empty poultry crates, a trailer having a two tiered trailer mounted conveyor, and a plurality of interconnectable two tiered conveyor sections. The trailer mounted conveyor and the conveyor sections both have a top tier and a bottom tier. Secondly, deploy the trailer mounted conveyor so that a first end extends into the freight compartment of the transport vehicle, and deploy the two tiered conveyor sections so that they extend from a second end of the trailer mounted conveyor into an enclosure containing live poultry. Thirdly, send poultry crates continuously along the trailer mounted conveyor and the conveyor sections from the freight compartment of the transport vehicle to the enclosure on one of the top tier and bottom tier. Fourthly, load the live poultry into the poultry crates at the enclosure and send the poultry crates containing live poultry continuously along the conveyor sections from the enclosure to the freight compartment of the transport vehicle on the other of the top tier and bottom tier.

1 Claim, 2 Drawing Sheets

5,469,815

METHOD OF LOADING LIVE POULTRY

FIELD OF THE INVENTION

The present invention relates to a method of loading live poultry at a poultry farm for conveyance by transport vehicle to a processing plant.

BACKGROUND OF THE INVENTION

U.S. Pat. No. 4,201,156 which issued to Kuhler in 1980 discloses a live poultry conveying system. This system consists of a plurality of conveyor sections which extend into a darkened chicken house. Fowl sitting quietly on the floor of the darkened chicken house are placed on the conveyor and are conveyed through a zone darkened by cover to a crating area. At the crating area they are placed into large coops, with each coop containing approximately eighteen fowl. The coops are then sent via a conveyor belt into a transport vehicle.

A poultry conveying system, as described in the Kuhler reference, is predicated upon the fowl remaining inactive during handling. The fact is that fowl do not remain inactive. If placed upon a slow moving conveyor the fowl sense the motion and a large proportion tend to walk backwards on the conveyor causing congestion or jump off the conveyor altogether. As well, the poultry conveying system as taught by Kuhler does not meet the needs of industry. In order to make money persons engaged in the loading and hauling of live poultry must be able to load 7000 to 8000 birds within a time duration of less than two hours. This requires the conveyor belt to be moving at speeds of approximately 4 feet per second. At such conveyor speeds fowl have a tendency to roll on the conveyor belt, becoming bruised and damaged.

SUMMARY OF THE INVENTION

What is required is a method of loading live poultry that will serve the needs of industry better than the Kuhler system.

According to the present invention there is provided a method of loading live poultry. Firstly, provide a transport vehicle having a plurality of empty poultry crates, a trailer having a two tiered trailer mounted conveyor, and a plurality of interconnectable two tiered conveyor sections. The trailer mounted conveyor and the conveyor sections both have a top tier and a bottom tier. Secondly, deploy the trailer mounted conveyor so that a first end extends into the freight compartment of the transport vehicle, and deploy the two tiered conveyor sections so that they extend from a second end of the trailer mounted conveyor into an enclosure containing live poultry. Thirdly, send poultry crates continuously along the trailer mounted conveyor and the conveyor sections from the freight compartment of the transport vehicle to the enclosure on one of the top tier and bottom tier. Fourthly, load the live poultry into the poultry crates at the enclosure and send the poultry crates containing live poultry continuously along the conveyor sections from the enclosure to the freight compartment of the transport vehicle on the other of the top tier and bottom tier.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 1:
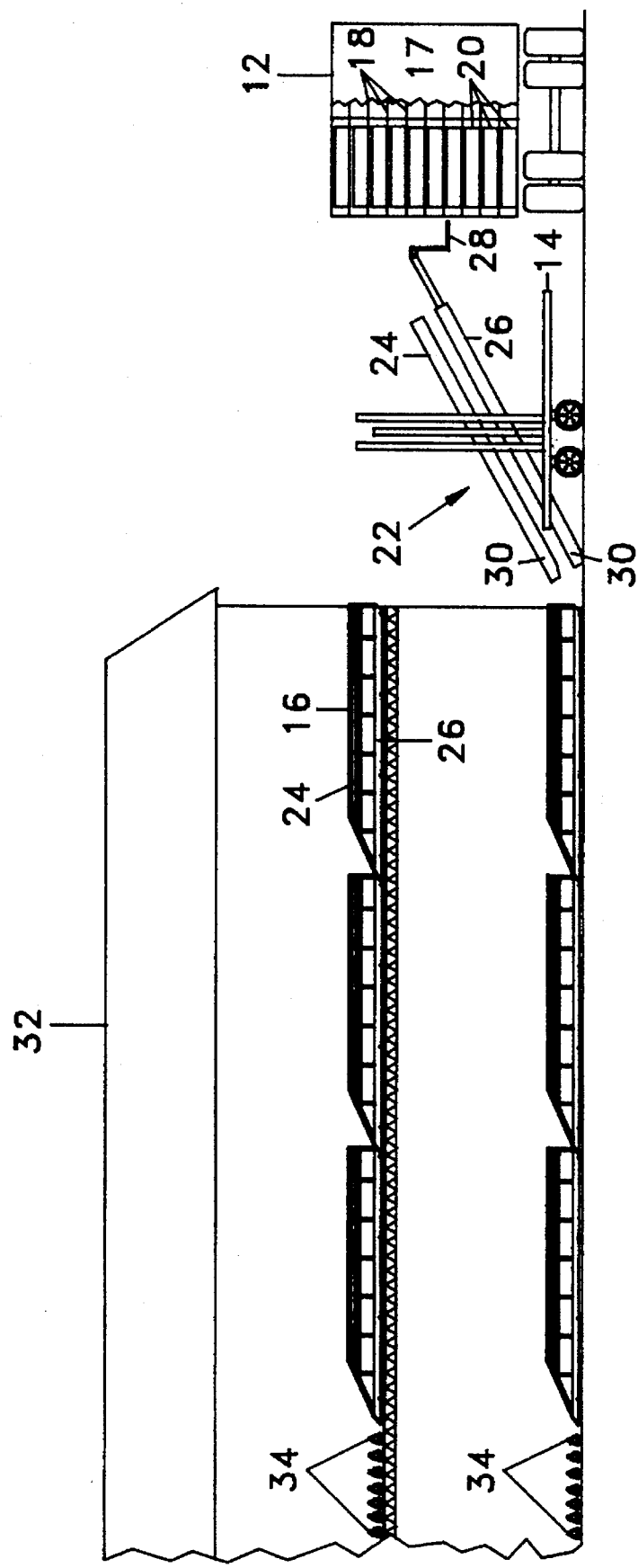
FIG. 1 is a side elevation view illustrating a method of loading live poultry in accordance with the teachings of the present invention.
Figure 2:
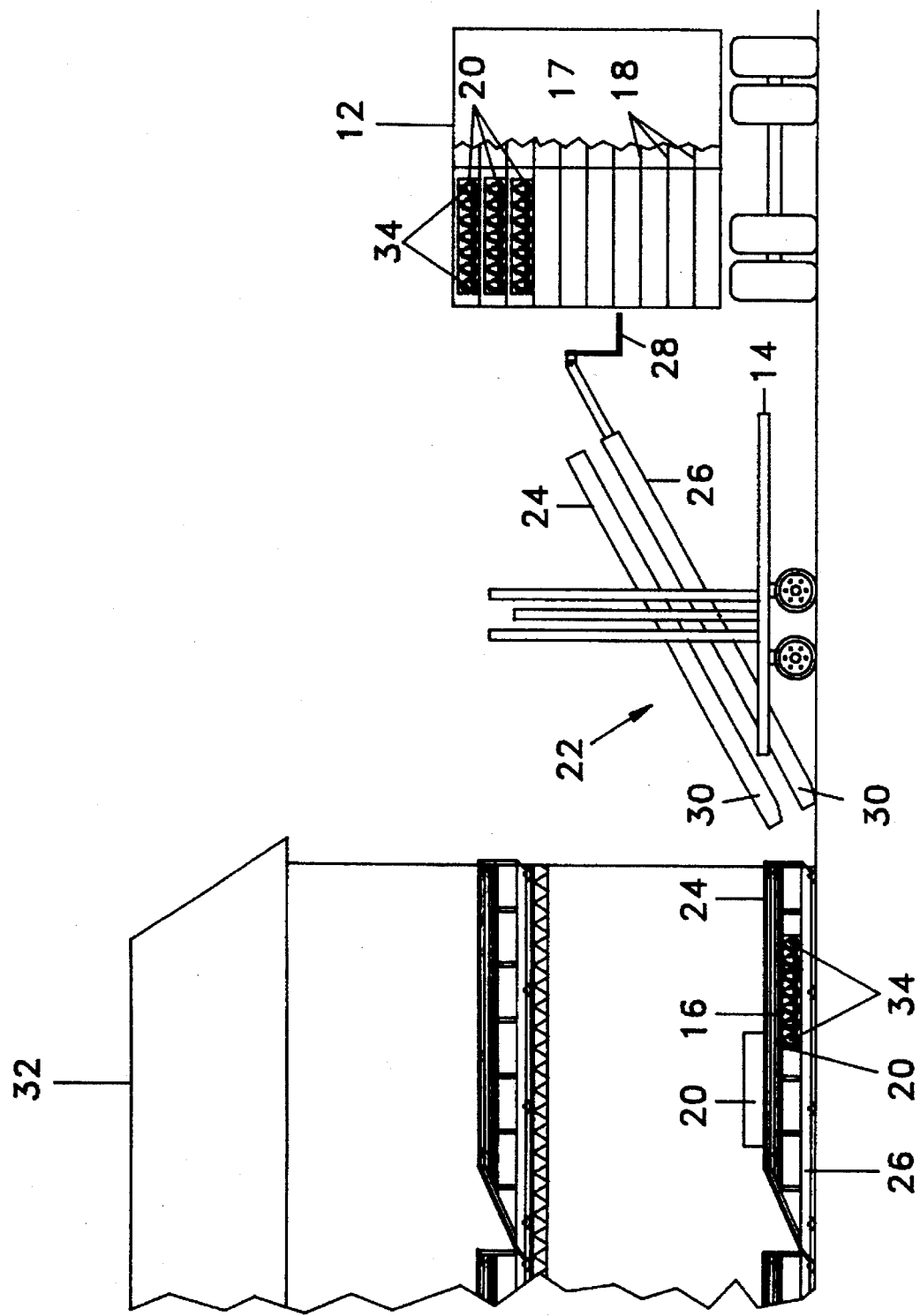
FIG. 2 is a detailed side elevation view of the method illustrated in FIG. 1.

The preferred method of loading live poultry will now be described with reference to FIGS. 1 and 2.

The method includes the following steps. Firstly, provide a transport vehicle 12, a trailer 14 and a plurality of two tiered conveyor sections 16. Transport vehicle 12 has a freight compartment 17 with a plurality of drawers 18 each of which contains an empty poultry crate 20. Trailer 14 has a two tiered trailer mounted conveyor 22. Trailer mounted conveyor 22 and conveyor sections 16 being two tiered have a top tier 24 and a bottom tier 26. Secondly, deploy trailer mounted conveyor 22 and conveyor sections 16. Trailer mounted conveyor 22 is deployed so that a first end 28 extends into freight compartment 17 of transport vehicle 12. Conveyor sections 16 are deployed so that they extend from a second end 30 of trailer mounted conveyor 22 into an enclosure 32 containing live poultry 34. Thirdly, send poultry crates 20 continuously along trailer mounted conveyor 22 and conveyor sections 16 from freight compartment 17 of transport vehicle 12 to enclosure 32 along top tier 24, as illustrated in FIG. 2. Fourthly, load live poultry 34 into poultry crates 20 at enclosure 32 send poultry crates 20 containing live poultry 34 continuously along conveyor sections 16 and trailer mounted conveyor 22 from enclosure 32 to freight compartment 17 of transport vehicle 12 on bottom tier 26.

In some enclosures 32 live poultry 34 are kept on both an upper floor and a lower floor. In such cases it is preferred that both first end 28 and second end 30 of conveyor 22 be height adjustable. First end 28 is raised and lowered to provide access to drawers 18 in freight compartment 17. Second end 30 is positioned at floor height, depending upon whether the upper floor or the lower floor is being unloaded.

It will be apparent to one skilled in the art that the method, as described above, is better suited to rapid loading of live poultry using high speed conveyors. With appropriate manpower gathering live poultry 34 within enclosure 32, poultry crates 20 are sent back loaded along lower tier 26 just as fast as they arrive via upper tier 24. There is no risk of damaging live poultry 34 during the relatively rapid ride along conveyors 16 and 22, as they are secure within one of poultry crates 20.

It will be apparent to one skilled in the art that modifications may be made to the illustrated embodiment without departing from the spirit and scope of the invention as hereinafter defined in the Claims.

THE EMBODIMENTS OF THE INVENTION IN WHICH AN EXCLUSIVE PROPERTY OR PRIVILEGE IS CLAIMED ARE DEFINED AS FOLLOWS:

1. A method of loading live poultry, comprising the steps of:

firstly, providing a transport vehicle having a plurality of empty poultry crates, a trailer having a two tiered trailer mounted conveyor, and a plurality of interconnectable two tiered conveyor sections, the trailer mounted conveyor and the conveyor sections both having a top tier and a bottom tier;

secondly, deploying the trailer mounted conveyor so that a first end extends into the freight compartment of the transport vehicle, and deploying the two tiered conveyor sections so that they extend from a second end of the trailer mounted conveyor into an enclosure containing live poultry;

thirdly, sending poultry crates continuously along the trailer mounted conveyor and the conveyor sections from the freight compartment of the transport vehicle to the enclosure on one of the top tier and bottom tier; and fourthly, loading the live poultry into the poultry crates at the enclosure and sending the poultry crates containing live poultry continuously along the conveyor sections from the enclosure to the freight compartment of the transport vehicle on the other of the top tier and bottom tier.

* * * * *